April 17, 1956     R. P. BUTLER     2,742,233
HEATING SYSTEM
Filed Oct. 4, 1951     2 Sheets-Sheet 1
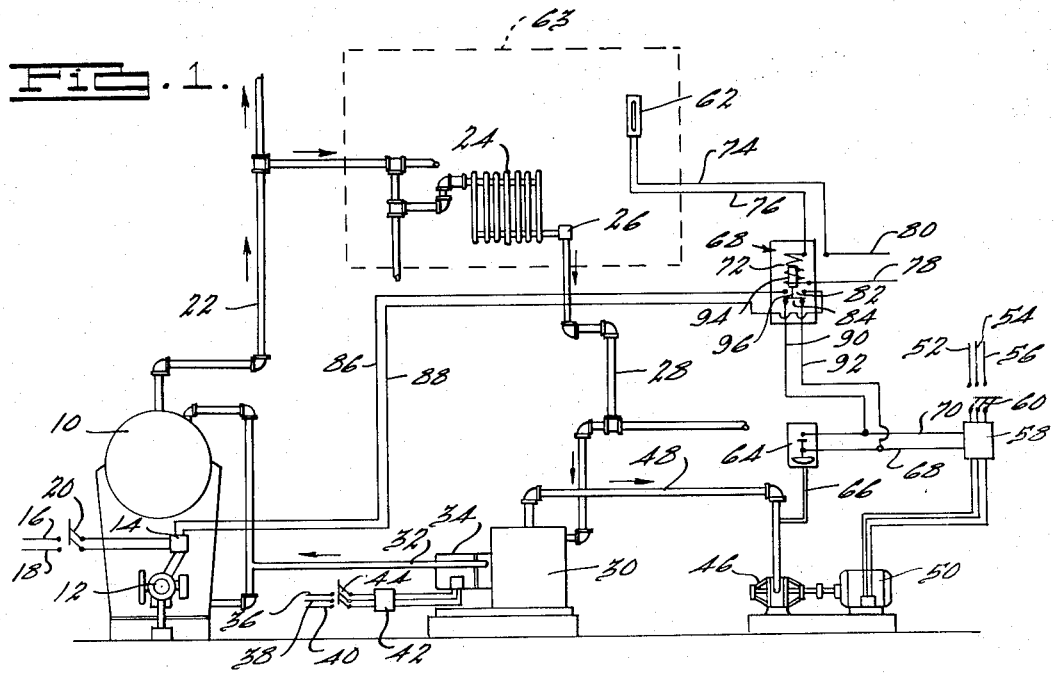
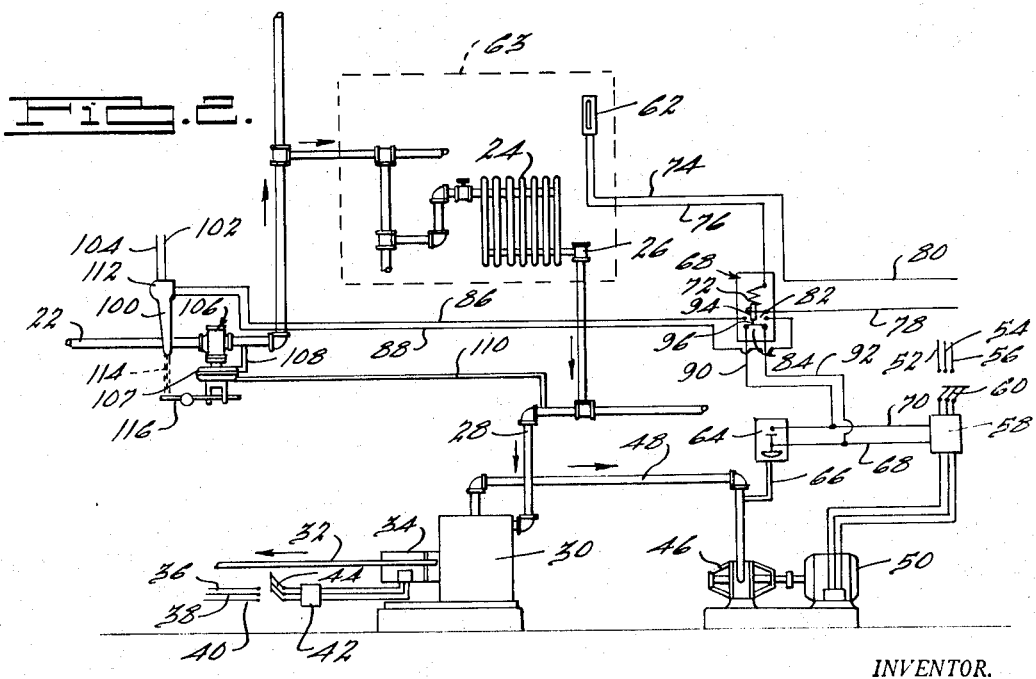
INVENTOR.
Robert P. Butler.
BY
Harness, Dickey & Pierce
ATTORNEYS.

April 17, 1956  R. P. BUTLER  2,742,233
HEATING SYSTEM
Filed Oct. 4, 1951  2 Sheets-Sheet 2

INVENTOR.
Robert P. Butler.
BY
Harness, Dickey & Pierce
ATTORNEYS.

United States Patent Office 2,742,233
Patented Apr. 17, 1956

2,742,233

HEATING SYSTEM

Robert P. Butler, Birmingham, Mich., assignor of 28/88 to Joseph J. Reader, 22⅔/88 to Albert E. Fisher, and 16/88 to Harold E. Rose, jointly Application October 4, 1951, Serial No. 249,783

15 Claims. (Cl. 237—9)

This invention relates to new and useful improvements in steam vacuum heating systems of the so-called "on-off" type wherein steam is supplied intermittently to space heaters in the system in accordance with heat demands on the system and wherein circulation of steam in the system is obtained by a vacuum pump or the like connected in the return line of the system.

In conventional operation of a steam vacuum heating system of the above type, flow of steam to the heaters usually is controlled by a valve which in turn is operated by an automatic cycling device such as a conventional thermostat or an automatic timing device which turns the steam on for a predetermined period of time and then turns it off for a predetermined time interval.

The thermostatic control for the valve conveniently may be a conventional room thermostat which usually is mounted in a representative or "key" room and senses changes in the air temperature of the room, or it may be a conventional radiator thermostat which senses changes in the temperature of a "key" radiator in the system.

Various types of automatic timing devices are available. Obviously, the "on" and "off" time schedule of these devices must vary with the outdoor temperature. Some of these devices are manually adjustable to compensate for changes in temperature and others adjust themselves automatically. In the case of a manually adjustable cycling device, the operator of the heating system notes the outdoor temperature and makes appropriate adjustments of the device from time to time. Manifestly, this type device requires personal supervision and almost constant attention. The automatic cycling devices adjust the time cycle of the device automatically in accordance with the outdoor temperature. These devices usually include a bulb or thermostatic element which is located outdoors and which automatically resets or adjusts the device so that it changes its cycle in accordance with changes in outdoor temperature. The thermostatic element changes the control point of the cycling device which then continues to cycle on and off in accordance with the temperature schedule until the thermostatic element resets the control point in response to another change in the outdoor temperature. Automatic cycling devices are of course preferred as they eliminate the constant attention that must be given the manually adjustable cycling device.

The instant invention can be adapted to any type "on-off" steam vacuum heating system regardless of the particular control used to turn the system on and off. The important thing is that some means be provided for admitting steam to the system periodically or at spaced time intervals. Regardless of the particular type control used, the system embodying the instant invention is operative to open the valve to admit steam to the heaters and it makes no difference whether it functions to open the valve when the temperature to which the control is sensitive falls to a predetermined minimum or in accordance with a periodic time cycle. Similarly, it makes no difference whether the control operates to close the valve to interrupt flow of steam when the temperature sensed by the control rises a predetermined amount or at spaced intervals of a predetermined time cycle.

The vacuum producer, usually a combination condensate and vacuum pump known in the trade as a vacuum heating pump, is operative to maintain a predetermined vacuum in the return lines of the system.

In one conventional mode of operation the vacuum heating pump is controlled by conditions in the return line of the system. When the absolute pressure in the return line rises to a predetermined maximum (usually three inches of mercury vacuum), the pump is turned on and operated continuously until the absolute pressure in the return line falls to a predetermined minimum (usually about eight inches of mercury vacuum). Thus, in conventional practice, the steam-control valve is operated intermittently according to the temperature demands on the system and the vacuum producer also is operated intermittently in accordance with the pressure conditions in the return line of the system. In this type of conventional heating system, there is no co-ordination between the steam-control valve and the vacuum pump. Each operates independently of the other.

Steam heating systems of the above type generally are rendered inefficient under certain conditions by accumulation of condensate at one or more places in the system and attendant natural or induced vacuum (as it is known in the trade) in the heaters and supply lines thereto. Induced vacuum is created by the system itself rather than by a vacuum produced. Induced vacuum invariably results when steam condenses in the system. The traps at the radiator outlets close when the radiators fill with steam; and when the steam valve is shut off, the entire supply side of the system is a confined space at least momentarily. Steam continues to condense in the radiators or heaters and in the supply lines of the system after the steam valve is closed, and as no additional steam is admitted to replace the condensed steam an "induced" vacuum is created. Further, the system continues to create an induced vacuum even after the radiator traps begin to open and as long as there is steam present that can condense in the system. In an ordinary system, an induced vacuum of from ten to fifteen inches of mercury may be produced; and if the system is exceedingly tight, an even higher induced vacuum may result. Induced vacuum prevents the condensate from draining out of the heaters, and this condensate prevents the steam from circulating through the heaters.

It is the purpose of this invention to keep steam moving through the system in one direction to and through the radiators toward the return line at all times and to keep air, non-condensable gases and condensate flowing in the same direction even when the steam valve is shut off. To my knowledge no on-off type of steam heating system has ever been operated before to achieve this result. This mode of operation is different than the conventional on-off system in which the steam flows to and through the radiators toward the return line only during the on period.

As suggested, a steam vacuum heating system operated in the conventional on and off manner has the disadvantage of uneven heating. When heat is not properly distributed among the several radiators, the radiators nearest the steam source obtain more steam than the remote radiators. This follows logically since the entering steam fills the closest radiators and moves progressively through the system toward the more remote radiators. Thus the radiators are filled with steam progressively in accordance with their distance from the steam source. If the on cycle is relatively short, the steam may never reach the radiators most distant from the steam source. Also, if steam reaches all the radiators, the ones more remote from the steam source receive steam for different periods of time. The radiators nearest the steam source are filled with steam for substantially the entire "on" period, whereas the other radiators are filled with steam for progressively shorter periods of time, depending on their distance from the steam source.

Not only will the radiators closest the steam source heat for longer periods of time but they actually contain greater amounts of steam, since the pressure is higher at this point than at more remote points in the system. By reason of the greater quantity of steam in the radiators closest the steam supply, relatively greater induced vacuum is produced in these radiators than in the more remote radiators. Since steam moves always toward the point of lowest pressure in the system, the flow of steam actually reverses when the control valve is shut off, and this reversal of movement causes the steam actually to recede from the more remote radiators. As this steam is drawn out, air and gases are drawn in through the open traps through the return line. Accordingly, if the off period is of any appreciable duration, the distant radiators go cold. By reason of this condition, the closest radiators which receive the most steam and which contain steam for the longest period of time when the steam valve is open actually rob the other more remote radiators of their steam and remain heated for a longer period of time when steam to the system is shut off.

Not only does incoming air cause the more remote radiators to become cold quickly but the air actually blocks the normal flow of the steam when steam is again admitted to the system. This air must be pushed back through the open traps of the radiators by the incoming steam before the steam can fill the radiators.

The above explains why, in conventional steam heating systems of the on-off type, remote radiators may never receive steam, particularly in mild weather, or they may heat eratically even under most favorable conditions. The above also points up the desirability of operating these systems in accordance with the present invention which maintains the steam uniformly distributed among all the radiators at all times and prevents the near radiators from obtaining more than their proportionate share of the steam.

In further explanation it is interesting to note that in a system which is set for full steam on at zero degrees' temperature outdoors and steam off at seventy degrees' temperature outdoors, the steam is on only fourteen per cent of the time when the outside temperature is sixty degrees, twenty-one per cent of the time when the outdoor temperature is fifty-five degrees, twenty-nine per cent of the time when the outdoor temperature is fifty degrees, thirty-six per cent of the time when the outdoor temperature is forty-five degrees, and fifty per cent of the time when the outdoor temperature is thirty-five degrees.

From the above it will be apparent that on a sixty-degree day, steam would be off for twelve minutes and on for two minutes. If the system is at all extended, two minutes is not long enough for the steam to reach the remote radiators. As a consequence only the radiators nearest the source of supply are heated. In solution of the problem thus created it is not practical to increase the minimum on period sufficiently to get steam to the far radiators because this causes the near radiators to overheat. Furthermore, an increase in the on period requires a corresponding increase in the off period in order to maintain the desired average temperature, and all the radiators would therefore remain cold an immoderate length of time.

Even in a fifty-degree day, the off period is approximately two and one-half times as long as the on period, and in a conventional on-off system the only movement of steam occurring during this long off period is that caused by condensation of the steam in the radiators. This causes the radiators which are condensing steam most rapidly to rob the other radiators. As a consequence, the more favored radiators hog more than their share of the incoming steam when the control valve is again opened and the less favored radiators get less than their share or perhaps none at all.

The above condition obtains in both cold and mild weather. It is particularly aggravated in cold weather, however, when proper uniform heating is most desperately needed. As a general proposition the radiators that are still heating and condensing steam at the time the steam valve is opened exert a greater pull on the incoming steam than the radiators that have gone cold and are no longer condensing steam. In mild weather the on cycle is relatively short due to slight loss of heat from the building, and as a result of the short on phase of the cycle the thermostat may close the valve before any steam reaches the cold radiators. Thus, favored radiators overheat and the cold radiators remain cold during both cold and mild weather. In addition, pounding noises occur in the piping and heaters each operating cycle when incoming steam contacts water of condensation held in the system, and expansion and contraction noises of piping and radiators are common due to the variation in temperature to which they are subjected and the suddenness with which these variations occur.

In conventional systems of the types described above, induced vacuum may prevent the vacuum pump from operating, and, as a result, the latter is powerless to improve the situation. In this connection it will be readily appreciated that, when any radiator trap in the system opens, a direct connection is established between the steam-supply line and the condensate-return line. An equal absolute pressure or vacuum is thus established at least momentarily throughout the entire system, and this pressure may be lower than the pressure for which the vacuum regulator of the pump is set. In a typical installation, for example, a pump set to begin operation when the vacuum in the system rises to three inches of mercury vacuum would not start if an induced vacuum of ten to fifteen inches of mercury existed in the system.

An important object of the present invention is to provide a method of operating an on-off type steam vacuum heating system so as to obviate the ill effects normally inherent in this type system.

Another object of the invention is to provide simple and inexpensive means for converting a conventional on-off steam vacuum heating system for more efficient operation.

Yet another object of the invention is to provide an on-off steam vacuum heating system wherein all the radiators are substantially uniformly heated all the time.

Another object of the invention is to provide a steam vacuum heating system of the above-mentioned character wherein heat is distributed continuously and uniformly among all the radiators in the system even during the time when the steam-control valve is closed.

Other objects and advantages of the invention will be apparent during the course of the following description.

In the drawings forming a part of this specification and wherein like numerals are employed to designate like parts throughout the same:

Fig. 1 is a diagrammatic view showing a steam vacuum heating system embodying the invention, wherein the steam supply means is at all times in direct communication with the steam-supply line of the system and wherein operation of the vacuum pump is controlled during the initial warm-up period by the absolute pressure in the return line;

Fig. 2 is a diagrammatic view illustrating a modified steam vacuum heating system embodying the invention wherein flow of steam to the system is controlled by a constant differential valve;

Figure 3:
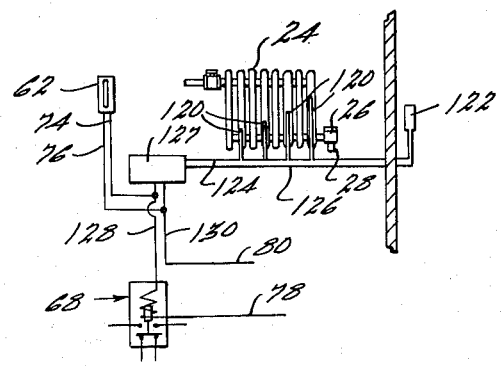
Figure 4:
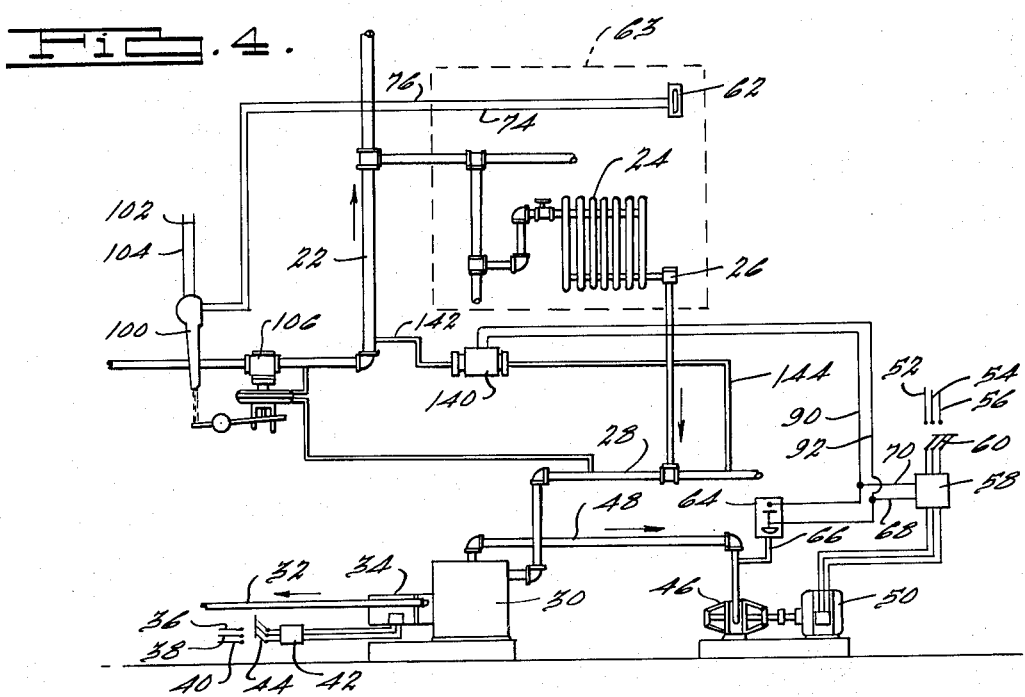

Fig. 3 is a fragmentary, diagrammatic view showing a steam vacuum heating system embodying the invention equipped with conventional indoor-outdoor control; and Fig. 4 is a diagrammatic view showing still another steam vacuum heating system embodying the invention wherein flow of steam to the system is controlled by a constant differential valve and the vacuum pump is operated by a differential pressure controller.

Fundamentally, the instant invention comprises a steam vacuum heating system wherein the steam-supply means and the vacuum producer are so correlated that the vacuum producer runs continuously to evacuate the system when and only when the steam-supply means is shut off and regardless of the absolute pressure or vacuum in the system. Stated differently, the invention is a steam vacuum heating system equipped with mutually co-operative means for operating the steam-control means and the vacuum-producer alternately. If admission of steam to the system is controlled by a valve and the vacuum producer is a pump, the pump runs continuously during the time the valve is closed and is stopped during the entire time the valve is open. It is a primary feature of this invention that the valve or other means for controlling the supply of steam to the system is operated by a suitable cycling device such as a thermostat or the like and that the pump is controlled solely by operation of the valve. In other words, the present invention contemplates that steam be admitted to the system in accordance with heat demands on the system and that the pump be operated only when conditions are such that steam is not being supplied to the system. As suggested, however, the pump is operated continuously during the time steam is shut off.

In order to explain further the construction and operating principles essential to the present invention, reference is first had to Fig. 1 which shows a relatively simple heating system embodying the invention. The particular system shown has a steam supply means in the form of a boiler 10 and a burner 12 is provided for generating steam in the boiler. In so far as the invention is concerned, the burner 12 may be any conventional apparatus such as an oil burner, a gas burner, or a stoker. It is preferred, however, that the burner be electrically controlled, and the burner 12 is here shown equipped with a suitable electrical controller 14. Current is supplied to the controller 14 through electrical conduits 16 and 18 controlled by a switch 20.

A steam supply line 22 extends from the boiler 10 to a heat exchanger here shown in the form of a radiator 24.

It is contemplated that the steam supply line 22 lead to a plurality of radiators 24; but in order to simplify the disclosure, only one radiator is shown. The radiator 24 is provided with the usual trap 26, and a return line 28 extends from the trap to the receiver of a condensate pump 30. Condensate discharged from the radiator 24 through trap 26 flows through the return pipe 28 to the condensate pump 30, and when a suitable amount of condensate has collected in the receiver of the pump, the the latter is operated in the conventional way to discharge the condensate through a pipe 32 leading back to the boiler 10. The pump 30 is driven by motor 34 and energizing current is supplied to the motor through electrical conduits 36, 38, and 40 and starter 42. Flow of current through conductors 36, 38, and 40 is controlled by a switch 44.

A vacuum pump 46 is connected to the receiver of condensate pump 30 by a pipe 48 operative to withdraw air and noncondensable gases from the receiver and from the return line 28. The pump 46 is driven by a motor 50, and energizing current is supplied to the motor through conduits 52, 54, and 56 and a starter 58. A switch 60 is provided in the conduits 52, 54, and 56 to control flow of current to the motor 50. Operation of the pump 46 reduces the absolute pressure in the system and particularly in the return side of the system so as to facilitate flow of steam to the radiator 24.

It is contemplated that the system be operated according to conventional practice to maintain a predetermined vacuum in the return lines 28 during the initial warm-up period and that it be converted to operate according to the present invention as soon as the indoor air reaches the temperature for which the control thermostat 62 is set. In the drawings the thermostat 62 is shown disposed in a key room designated 63, together with the radiator 24.

To this end, the vacuum pump 46 is provided with a vacuum regulator 64 which is connected to the pipe 48 by a pipe 66. The vacuum regulator 64 is electrically connected to the starter 58 by electrical conductors 68 and 70 in the usual way. As a typical example, the vacuum regulator 64 may be set to energize the motor 50 and start the pump 46 running whenever the pressure in the return lines 28 reaches three inches of mercury vacuum and to open the energizing circuit of the motor so as to stop the pump when the pressure in the return lines reaches eight inches of mercury vacuum.

During the beginning warm-up period the vacuum regulator 64 maintains the circuit to the motor 50 closed until the pump 46 has reduced the pressure in the returns of the system a predetermined amount. In the typical system referred to by way of example in the preceding paragraph, the pump 46 would operate until the pressure in the return lines had reached eight inches of mercury vacuum. As soon as the pressure in the returns of the system has been reduced sufficiently to operate the controller 64, the latter opens the circuit to the motor 50 and stops the pump 46. In the absence of other controlling factors, the vacuum pump 46 would remain shut down until the pressure in the system rose sufficiently (to three inches of mercury vacuum in the typical system given by way of example above) to activate the controller 64 to again close the circuit to the motor 50 and start the vacuum pump running. The vacuum pump would then continue to operate until the pressure in the return lines of the system has been reduced again sufficiently to satisfy the controller 64.

According to the instant invention, however, a relay 68 is electrically connected to the controller 14, the starter 58, and to the thermostat 62 so as to operate the pump 46 continuously at all times when the burner 12 is cut off regardless of the pressure in the return lines 28. More specifically, the energizing coil 72 of relay 68 is connected in series with the thermostat 62 by electrical conductors 74 and 76, and current is supplied thereto from any suitable source through conductors 78 and 80. The relay 68 also is provided with upper and lower pairs of contacts 82 and 84; the upper pair of contacts being connected to the controller 14 by electrical conductors 86 and 88 and the lower pair of contacts being electrically connected to conductors 68 and 70 by the two conductors 90 and 92. An armature 94 mounted to operate in the coil 72 carries a switch 96 and is movable to engage the switch with either the upper pair of contacts 82 or the lower pair of contacts 84. When the coil 72 is energized the switch 96 is held in engagement with the upper contacts 82, and when the coil 72 is deenergized the switch 96 is engaged with the lower contacts 84.

To start the system in operation, switches 20, 44, and 60 are closed. This ignites the burner 12 to produce steam in the boiler 10, energizes the motor 34 to operate the condensate pump 30 and energizes the motor 50 to operate the vacuum pump 46. At this time in the operating cycle the thermostat 62 is closed, calling for more heat in the room 63; and completing a circuit through the relay coil 72 to engage switch 96 with the upper pair of contacts 82. This closes a circuit through the controller 14 to maintain the burner 12 in operation continuously until sufficient steam has been supplied to the radiator 24 to heat the room 63 sufficiently to open the thermostatic switch 62. When switch 62 opens it interrupts the circuit through relay coil 72 and causes the armature 94 to drop to the position shown in the drawings, opening the circuit to the controller 14 and closing a circuit through the starter 58.

Thus, de-energization of the relay 68 stops the burner 12 and for all practical purposes shuts off the flow of steam to the heating system. At the same time, it closes a circuit to the motor 50 regardless of the position of vacuum controller 64 so that the vacuum pump 46 is set in operation. In normal operation of the system, these conditions obtain until the temperature in room 63 drops sufficiently to again close the thermostatic switch 62, at which time the latter operates relay 68 to reignite the burner 12 and again supply steam to the system and simultaneously to interrupt the circuit to pump 46 so that the latter is stopped. The vacuum pump 46 remains inoperative during the full period when steam is supplied to the system, unless, for some reason, the absolute pressure in the return line of the system should rise sufficiently to operate the lower limit vacuum regulator 64, in which event the pump 46 operates sufficiently to reduce the pressure in the system the predetermined amount for which the regulator is set.

This mode of operation causes steam to be distributed substantially uniformly at all times to the radiators 24 in the system.

Assume, for example, that all the radiators 24 in the system are filled with steam at the time the steam-supply valve is closed. Immediately an induced vacuum is created in the supply side of the system by the steam which condenses after the steam-supply valve is closed and water of condensation begins to accumulate in the radiators and perhaps at various other places in the system, but since at the same time the vacuum pump is started, it pulls from the return side of the system so as to reduce the pressure therein, and any water of condensation held up by induced vacuum is immediately released to the return line by the action of the vacuum pump and cannot interfere with continued distribution of steam during the off steam period.

As long as there is steam in the radiators and the latter are hot throughout, the thermostatic traps 26 with which the radiators are equipped remain closed, and the supply and return side of the system are maintained separate, excepting that when condensate and air form in the radiator and cool to the temperature at which the trap will function, it then opens and permits the air and condensate to pass to the return piping; however, as soon as any radiator in the system loses heat sufficiently, the trap on that radiator will open and remain open temporarily and thus permit the suction effect of the vacuum pump 46 to extend into the supply side of the system. This suction effect then acts to draw any steam in the system toward the trap. Since the trap is on the far side of the radiator, the suction effect fills, or substantially fills, the radiator with steam before the steam reaches the trap. As soon as the steam reaches the trap, the latter closes to prevent steam from being drawn into the return side of the system.

This action occurs all over the system wherever any radiator has chilled sufficiently to open the trap on the radiator. As a consequence, steam is constantly being pulled from the more favored parts of the system and distributed to the less favored parts even though no additional steam is being admitted to the system. In this manner, steam in the system is more or less uniformly distributed among the radiators as long as there is any steam in the system. In fact, as the steam in the supply side of the system becomes increasingly rarefied, the condensing action in the radiators coupled with the continued suction action of the pump tends to draw steam from the piping so that the steam is more or less concentrated in the radiators and there is less tendency for the heat to dissipate through the piping.

After traps in the system begin to open, the pressures in the steam supply and return sides of the system are never far out of balance, but there is always a slightly lower pressure in the returns due to the constant action of the vacuum pump 46, and a positive pulling action toward the pump is always present in the returns. In fact, no heating system is ever absolutely tight and there is always some leakage of air into the system. Air leakage is constantly moved toward the pump, and the moving air, however slight in amount it may be, has a tendency to move with it steam or any substance entrained therein. Thus these air currents, produced by leakage of air into the system, tend to assist in distributing the steam to the various radiators.

Not only does the instant invention maintain uniform heating throughout the system but it also keeps the thermostat satisfied for a longer period of time and, as a consequence, achieves a consequential saving in fuel and steam. This latter achievement is of course desirable under all circumstances but is particularly a factor where steam is purchased from an outside source.

Another advantage of the instant invention is that the entering steam pressure need not be as accurately controlled as in other on-off heating systems. When the thermostat is satisfied, it operates to shut off the flow of steam to the system and immediately sets the vacuum pump in operation, thereby expanding and redistributing whatever steam was admitted and obtaining maximum benefit therefrom. If the entering steam pressure is higher than necessary, an excess amount of steam will enter the system before it can be sensed by the thermostat; thus the thermostat will then simply remain satisfied for a longer period of time while the excess steam is being condensed. On the other hand, if the steam enters at a pressure lower than the optimum pressure, the thermostat will start the burner 12 and admit more steam sooner than it otherwise would.

From the foregoing it is apparent that induced vacuum is harmful and causes uneven heating in conventional on-off systems, and it is particularly significant in this connection that operation of the on-off system in accordance with the present invention actually utilizes induced vacuum to advantage. If an on-off steam heating system is operated in the manner herein described, induced vacuum actually assists in maintaining steam properly uniformly distributed among the several radiators in the system. In order to operate a steam heating system according to the present invention a vacuum must be created in the system, and as a practical matter it is immaterial whether this vacuum is created mechanically by a vacuum producer or automatically by condensation of steam in a closed or confined portion of the system. By reason of the fact that the instant mode of operation causes the vacuum pump to operate at the same time that induced vacuum is being created in the steam supply side of the system, the two vacuum-producing agencies work together or in unison. Thus, if induced vacuum is being created in the system at the same time that the pump is operating, the vacuum induced by the system itself will aid the pump in raising the vacuum level in the system. This coincidental operation helps to maintain uniform heating of all radiators because the pump removes the air that would otherwise be drawn into the radiators by the induced vacuum effect. Thus in the instant system there is no incoming air which pushes the steam out of the remote radiators and toward the radiators nearest the steam source as in a conventional on-off system. Instead, the pump keeps the air flowing toward the pump and thus causes steam in the system to stay in the remote portions thereof and to remain substantially uniformly distributed among all the radiators.

Further, it will be apparent that a higher vacuum can be produced in the system by using the simultaneous effect of the two vacuum-producing forces. It is desirable to produce a relatively high vacuum in the system since it expands the steam in the system and in this manner achieves an increased efficiency in operation. The advantage of heating with highly expanded steam will be apparent when it is considered that in mild weather very little of it is required to maintain the temperature of the space being heated at the desired point. In an on-off system operated according to conventional practice, however, it has been necessary to introduce a relatively large amount of steam under these conditions in order to provide enough pressure in the system to push the steam to remote portions thereof and to fill all the radiators. On the other hand, if the system is operated according to the present invention a much smaller amount of steam can be utilized during mild weather and it is not necessary to push the steam into remote parts of the system by pressure of the incoming steam since the steam will be drawn into the remote parts by the pump after the steam valve has shut off. The above points up clearly the advantage of operating at relatively high vacuum in mild weather, and if the system is operated according to the present invention, high vacuum level can be reached and maintained more easily than in conventional systems where the vacuum pump is operated and controlled merely by pressures in the system.

In view of the foregoing it will be apparent that the instant invention will operate to distribute steam uniformly among the radiators even though there is insufficient steam in the system to fill all the radiators. This is an important consideration, since in mild weather this condition may obtain all or a large part of the time. As a consequence the radiators will be only partially filled with steam. Under these conditions the amount of steam in the radiators is sufficient to maintain the surrounding air at the desired temperature. In conventional steam heating systems of the on-off type it is necessary to use orifices at strategic points in the system to force the steam to distribute uniformly throughout the system. However, this expedient has never been entirely satisfactory since it is difficult to provide exactly the right size orifices at exactly the right points in the system. Moreover, even though proper size orifices are provided initially, small solid particles carried into the system by the steam settle in the orifices and eventually plug them or change their size so as to prevent them from functioning properly. The instant invention eliminates the necessity of using orifices and therefore eliminates all the disadvantages attending use of orifices.

Reference is now had to Fig. 2 which shows other means for controlling a steam heating system according to the present invention. This steam heating system is substantially the same as the steam heating system first described except that it includes means for maintaining a predetermined pressure differential between the steam supply side and the return side and it has different means for controlling flow of steam into the system. For convenience and in the interest of brevity, corresponding parts in the two systems are identified by the same reference numerals.

In this form of the invention no means is shown for supplying steam to the line 22 but it will be understood that the supply line extends from a suitable source of steam under pressure such as the boiler 10 shown in Fig. 1. In this form of the invention the boiler or other source of steam maintains steam under pressure available at all times and flow of steam into the heating system is controlled by a constant differential valve 106 connected in the steam supply line 22. The valve 106 is operated by a conventional damper motor (sometimes referred to as an electric piston) 100, and current is supplied to the electric motor 112 of piston 100 from any suitable source through conductors 102 and 104. The two conductors 86 and 88 extending from the upper pair of contacts 82 of relay 68 are connected in series with the motor 112.

In operation, the valve 106 is opened when the relay 68 is energized by thermostat 62 to move the switch 96 into engagement with the upper pair of contacts 82. Conversely, when the thermostat 62 is satisfied and de-energizes relay 68, switch 96 opens contacts 82 and interrupts the electrical circuit to the motor 112 so as to close the valve 106 and to shut off flow of steam into the system.

The valve 106 admits steam at a rate to maintain a constant predetermined differential pressure between the steam supply side and the return side of the system regardless of whether the absolute pressure or vacuum in the return side is high or low. In this connection it will be observed that the constant differential valve 106 has the usual diaphragm chamber 107, one side of which is connected to the steam supply line 22 by a pipe 108 and the other side of which is connected to the return line 28 by a pipe 110. In most instances valves of the type shown at 106 are adjustable to give different differential pressures in the system, and the differential pressure employed in any particular instance depends upon the differential required to overcome the pressure drop in the system and to circulate steam to the remote ends of the system.

In a typical installation the valve 106 may be set to maintain a differential pressure of four inches of mercury vacuum (approximately two pounds per square inch). If, in this typical installation, it is assumed that twenty inches of mercury vacuum exists in the return side of the system when the thermostat 62 energizes the motor 112, the constant differential valve 106 regulates the admission of steam to the required pressure differential. Thus steam would enter the system at a pressure of sixteen inches of mercury vacuum. Since the vacuum pump 46 is shut off immediately when the valve 106 is opened, the absolute pressure in the returns increases gradually as the steam enters the system. Under these conditions, the constant differential valve 106 automatically compensates for the gradually increasing absolute pressure in the returns and admits steam into the system at a constantly increasing pressure, but always maintaining the four inches of mercury vacuum pressure differential required to assure proper circulation of steam through the system during the time the vacuum pump 46 is shut off.

In the particular arrangement shown in the drawings, the valve 106 is shown operated by the damper motor 112 which is connected by a chain 114 to the operating arm 116 of valve 106. When the thermostat 62 is satisfied and its contacts are open, the motor 112 pulls the arm of the steam-admission valve upwardly, closing off the flow of steam. Conversely, when the thermostat 62 calls for heat and its contacts are closed, the motor 112 releases the operating arm 116 and permits the valve to function, admitting steam according to its setting.

The advantage of using the differential type valve is that it will admit steam at a rate corresponding to the vacuum or absolute pressure in the return line. If the vacuum is high, the steam enters at a slower rate than if the vacuum is low. As a result, the steam does not enter the system with a rush as it would if a pressure reducing valve were employed set for some positive pressure such as one or two pounds which would be necessary in the coldest weather and which would cause considerable velocity noise in the milder weather when a vacuum of, say, twenty inches existed in the system. It is obvious that if steam at two pounds were suddenly admitted to a system where there was a vacuum of twenty inches, the sudden expansion of steam in the system would be very noisy.

Except for the foregoing, the heating system shown in Fig. 2 operates in the same manner and achieves the same advantages as the system shown in Fig. 1.

Fig. 3 shows the radiator 24 equipped with a conventional indoor-outdoor thermostatic control. More particularly, the radiator 24 has a plurality of indoor elements 120 fastened thereto. An element 122 placed out of doors is connected in series with the elements 120 by electrical conductors 124 and 126. The two conductors 124 and 126 are connected to the usual Wheatstone bridge-type controller 127. Conductors 128 and 130 connect the controller 127 to the relay 68 and conductor 80 respectively, as shown. The two conductors 74 and 76 extending from thermostat 62 are connected to conductors 128 and 130 behind the controller 126.

In practice, the control means shown in Fig. 3 can be incorporated in any system embodying the invention. If it is assumed, for example, that the control means is incorporated in the heating system shown in Fig. 2, the operation of the system is as follows:

The thermostat 62 controls the heating system during the warm-up period and therefore preferably is located at some point indoors representative of the temperature conditions throughout the building. When the building is cold, the contacts of thermostat 62 are closed, thus maintaining the relay 68 energized operating the damper motor 100 and holding the valve 106 open. When the temperature in the building reaches the temperature for which the thermostat 62 is set, the contacts of the thermostat open, opening the circuit to the damper motor 100 and closing the steam supply valve 106. The controller 127 thereafter operates to hold the temperature thus established in the building. In accordance with the conventional practice the thermostat 62 operates on a differential of several degrees. Thus, when the thermostat 62 is satisfied and its contacts open, it will not again close its contacts until the temperature in the room has dropped several degrees. This permits the controller 127 to control the system after the intital warm-up and prevents the thermostat 62 from taking control away from the controller 127. Most commercially available thermostats are adjustable to vary the differential within limits. If the thermostat 62 did not operate in this manner, opening of a window in its vicinity would cause the thermostat to close contacts and call for steam even though the controller 127 were satisfied.

When the indoor and outdoor temperatures are relatively static, the controller 127 controls the on and off cycles of the system automatically according to the temperature of the radiator 24. Thus, when the radiator 24 becomes cold, the controller 126 energizes relay 68 and opens the valve 106 to admit steam to the system. As soon as the radiator 24 warms up sufficiently, controller 126 de-energizes relay 68 and closes the valve 106 to shut off flow of steam to the system. Under these circumstances the steam-supply valve 106 is operated entirely by the indoor elements 120.

However, the outdoor element 122 also plays a part in the operation of the system. For example, if the outdoor temperature falls, the change is sensed by element 122 which then affects the controller 126 and calls for steam before the indoor elements 120 normally would do so. Thus, the control anticipates a change in requirement for heat and supplies additional steam to the system before the requirement is actually sensed by the indoor thermostat 62.

Another advantage of this control is that it is not affected by local changes in the indoor temperature such as that brought about by the opening of a window or the like in the vicinity of the thermostat 62. In this manner uniform heating throughout the building is assured, even though local temperature conditions in the vicinity of the controller vary considerably. If the system was controlled solely by the room thermostat 62, the entire building would be overheated if a window were opened in the vicinity of the thermostat. Also, the indoor-outdoor controller maintains a more even temperature, since the temperature of the radiator 24 drops more quickly than the temperature of the room, and the elements 120 attached to the radiator therefore sense the change more quickly than the thermostat 62 which responds merely to the room temperature.

Reference is now had to Fig. 4 which shows still another steam heating system embodying the invention. This system is generally similar to the one shown in Fig. 2 but differs in that the vacuum pump 46 is not controlled directly by the thermostat 62 through the relay 68. In some installations, it may not be practical to wire the thermostat 62 directly for operation of the vacuum pump and under these circumstances the pump may be operated indirectly by a pressure controller 140 as shown in Fig. 4. In order to simplify the description, corresponding parts in Figs. 2 and 4 are identified by the same reference numerals.

In Fig. 4 the conductors 74 and 76 leading from the thermostat 62 are connected directly to the valve 106. Thus, the thermostat opens and closes the valve 106 according to the rise and fall of the temperature in the room 63, and in the particular arrangement shown the constant differential valve 106 maintains a requisite differential between the steam supply and return lines of the system when the valve 106 is open.

In order to operate the vacuum pump 46 alternately with the admission of steam into the system, the conductors 90 and 92 are electrically connected to the differential pressure controller 140. The latter is of conventional construction, having mechanically interconnected diaphragms in the ends thereof which act to open and close a switch connecting conductors 90 and 92 according to the differential in pressure in steam supply and return lines of the system. In this connection it will be observed that the one end of the controller 140 is connected to the steam pipe 22 by a pipe 142 and that the other end of the controller is connected to the return line 28 by a pipe 144.

During normal operation of the system with the valve 106 closed, pressures in the steam supply and return sides of the system are substantially equal. Thus, pressure against the two diaphragms on the ends of the controller 140 is substantially equal and the switch which interconnects conductors 90 and 92 in the controller is closed. Under these conditions a circuit to the motor 50 which operates vacuum pump 46 is closed so that the vacuum pump operates continuously.

It will be understood in this connection that while the absolute pressure in the returns may be slightly lower than the pressure in the steam supply line due to the continuous operation of the pump 46, the controller 140 is adjusted so that it will not respond to this slight differential in pressure and thus will not open the switch to interrupt the flow of current to the motor 50 which drives the pump. However, when the thermostat 62 opens valve 106 to admit steam to the system, the inflowing steam instantly increases the pressure substantially in the supply line 22, and a substantial pressure differential exists between the supply line and the return line 28. When this occurs, the unequal pressures against the diaphragms at the ends of controller 140 open the switch in the controller and interrupt flow of current to the motors 50 so as to stop the vacuum pump 46.

These relative conditions obtain in the system as long as the valve 106 is open and steam is flowing into the system. The steam of course continues to flow until the thermostat 62 is satisfied and shuts off the valve 106. When the valve 106 is closed, pressures quickly equalize in the two sides of the systems, and the controller 140 again closes a circuit through the motor 50 which again drives the vacuum pump 46. The vacuum pump continues to operate until the valve 106 is again opened by the thermostat 62.

In this installation the pump 46 will not necessarily begin to operate immediately when the valve 100 closes. A short time lag may occur when the valve 100 is closed and the pump 46 is inoperative. However, no ill effects result from the supply delay in the operation of the pump, and for all practical purposes the system achieves the same advantages as the systems first described.

With the exception of the above specific description, the system shown in Fig. 4 operates exactly as discussed in connection with Fig. 2 and both systems achieve the same advantages.

It may thus be seen that I have achieved the objects of my invention. I have provided a steam heating system wherein steam is supplied intermittently to radiators or other heat-exchange means according to demands on the system and wherein steam is uniformly distributed throughout the system at all times even when flow of steam to the system is shut off. In this manner, uniform heating throughout the system is achieved. There are no "favored" radiators and no radiator in the system is permitted to go cold while other radiators remain heated. At the same time, undesirable noises caused by excessive expansion and contraction of the radiators and piping or by contact of steam with cold radiators or condensate during normal operation of the system are avoided. The invention can be readily applied to conventional systems and these systems can be adapted to incorporate my invention with very little effort or additional expense.

Having thus described the invention, I claim:

1. In the operation of a steam heating system of the type having a steam-supply means for delivering steam to the system and a vacuum producer for exhausting air and noncondensable gases from the system, the steps comprising controlling the steam-supply means directly as a primary function to furnish steam intermittently to the system in accordance with the heat demands on the system, and co-ordinating operation of the vacuum producer with the steam supply so that the vacuum producer operates as a secondary function subordinate to said steam-supply means continuously when and only when the supply means is shut off.

2. In the operation of a steam heating system of the type having heat-exchange means, a steam-supply pipe leading to the heat-exchange means, a return pipe from the heat-exchange means, means connected to the steam-supply pipe for delivering steam to the system, a vacuum producer connected to the return pipe for exhausting air and noncondensable gases from the system, and thermostatic control means operatively connected to the steam-supply means to regulate admission of steam to the system, the steps of operating the thermostatic control means to admit steam periodically to the system in accordance with the heat demands of the space being heated, and controlling operation of the vacuum producer in accordance with operation of said thermostatic control means so that during normal operation of the system said vacuum producer operates continuously when and only when the steam-supply means is shut off by said thermostatic control.

3. In the operation of a space-heating system of the type having space heaters, steam-supply lines to the heaters, return lines from the heaters, steam-supply means connected to the supply lines, a control valve in the steam-supply lines and a vacuum producer connected to the return lines, the steps of opening the control valve periodically as a primary function to admit steam to the system at spaced intervals and in accordance with heat demands of the space being heated, and operating the vacuum producer as a secondary function subordinate to the operation of said control valve so that the vacuum producer functions continuously when and only when steam is not being supplied to the system.

4. In the operation of a space-heating system of the type having space heaters, steam-supply lines to the heaters, return lines from the heaters, steam-supply means connected to the supply lines, a valve in the steam-supply lines controlling flow of steam into the system, a vacuum producer connected to the return lines, and a thermostatic control for said valve, the steps comprising operating said valve periodically to admit steam to the system intermittently as required by the thermostatic control, and operating the vacuum producer in accordance with operation of the valve so that the vacuum producer operates continuously during the intervals when steam to the system is shut off.

5. In the operation of a space-heating system of the type having space heaters, a steam-supply line to the heaters, return lines from the heaters, a valve on the steam-supply line for controlling flow of steam to the system, steam-supply means connected to the supply lines, and a vacuum producer connected to the return lines, the steps of operating said valve directly by an automatic cycling device to admit steam intermittently to the system, and timing operation of the vacuum producer with operation of the valve so that the vacuum producer operates as a secondary function subordinate to operation of said valve to exhaust air and noncondensable gases from the system continuously during and only during the periods when the valve is shut off.

6. In a space-heating system of the class wherein a steam-supply means furnishes steam to space heaters intermittently as required by an on-off cycling device and wherein a vacuum producer is connected to the space heaters to maintain the system under subatmospheric pressure and free of air, condensate, and noncondensable gases, the combination with said vacuum producer of a control operative to run the vacuum producer as a secondary function subordinate to the supply of steam to the system continuously during the off periods of the steam supply means.

7. A space-heating system wherein steam supply means supplies steam to space heaters in the system until an on-off thermostatic cycling device incorporated as a part of the system is satisfied, whereupon the cycling device acts on the steam supply means to shut off flow of steam to the system until the temperature at the cycling device drops sufficiently to require additional steam in the system to raise the temperature sufficiently so that the cycling device again shuts off the steam supply means, and wherein a vacuum producer is connected to the space heaters to maintain the system normally at a pressure less than atmospheric and to remove air, condensate and noncondensable gases from the system, said system being characterized by the fact that there is combined with said vacuum producer a control operatively connected to said cycling device and actuated thereby to operate the vacuum producer continuously during the periods when steam to the system is shut off.

8. A space-heating system wherein steam is supplied to space heaters in the system intermittently by an electrically operated steam-supply means having a thermostatically operated switch which turns on the steam supply means to furnish steam to the space heaters when the temperature in the system falls to a predetermined minimum and which shuts off the steam supply means so that little if any steam is supplied to the heaters when the temperature in the system reaches a predetermined maximum and wherein a vacuum producer is connected to the space heaters to maintain the same relatively free from air, condensate and noncondensable gases, said system characterized by the fact that there is in combination with said thermostatically operated switch, said vacuum producer and said steam supply means, a control connected in the system and operative to start the vacuum producer substantially immediately when the steam supply means is shut off by said thermostatic switch, to run the vacuum producer continuously during the off period of the steam-supply means, and to shut off the vacuum producer substantially immediately when the steam supply means is turned on by said thermostatic switch.

9. In a space-heating system of the type having space heaters, steam supply lines to the heaters, return lines from the heaters, electrically operated steam supply means connected to the supply lines, and a vacuum producer connected to the return lines, the improvement comprising temperature-sensitive means operatively connected to the steam supply means to operate the same intermittently as a primary function in accordance with demands on the system, and means responsive to operation of the steam-supply means for operating the vacuum producer as a secondary function subordinate to the supply of steam to the system continuously during the intervals when the steam-supply means is shut off by said temperature-sensitive means.

10. In a space-heating system of the type having space heaters, a steam-supply line to the heaters, a return line from the heaters, a valve controlling said steam-supply line and a vacuum producer connected to the return line to maintain the system substantially free from condensate and noncondensable gases, the improvement comprising temperature-sensitive means connected to the valve and operative to open and close the valve alternately in response to demands on the system, and means responsive to operation of the valve for operating the vacuum producer continuously when the valve is closed.

11. In a space-heating system of the type having space heaters, a steam-supply line to the heaters, a return line from the heaters, steam supply means connected to said steam-supply line, and a vacuum producer connected to the return line to maintain the system substantially free from condensate and noncondensable gases, the improvement comprising means for turning the steam-supply means on and off at spaced time intervals, and means controlled by said first-mentioned means for operating said vacuum producer continuously during the time the steam is shut off.

12. In a space-heating system of the type having space heaters, a steam-supply line to the heaters, a return line from the heaters, steam-supply means for supplying steam to the heaters through said steam-supply line, a vacuum producer connected in said return line operative to keep the heaters substantially free from condensate and noncondensable gases, and a thermostatic control for operating the steam-supply means intermittently in accordance with demands on the system, the improvement comprising means operatively connected to the thermostatic control and to the steam-supply means to admit steam to the system when the temperature reaches a predetermined minimum and to shut off steam to the system when the temperature reaches a predetermined maximum, and means sensitive to conditions in the system for operating said vacuum producer continuously when the steam supply to the system is shut off.

13. In a space-heating system of the type having space heaters, a steam-supply line to the heaters, a return line from the heaters, steam-supply means for supplying steam to the heaters through said steam-supply line, a vacuum producer connected in said return line operative to keep the heaters substantially free from the condensate and noncondensable gases, and a thermostatic control for operating the steam-supply means intermittently in accordance with heat demands on the system, the improvement comprising means operatively connected to the thermostatic control and to the steam-supply means to admit steam to the system when the temperature reaches a predetermined minimum and to shut off steam to the system when the temperature reaches a predetermined maximum, and a control sensitive to conditions in the system for operating said vacuum producer continuously when the steam supply to the system is shut off, for shutting off the vacuum producer substantially immediately when the steam-supply means is rendered operative to supply steam to the system, and for maintaining the vacuum producer shut off during the entire period steam is being supplied to the system.

14. In a space-heating system of the type having space heaters, a steam-supply line to the heaters, a return line from the heaters, electrically operated steam-supply means connected to the supply line for controlling flow of steam to the heaters, an electrically operated vacuum producer connected in the return line to maintain the heaters free from condensate and noncondensable gases, and a thermostatic switch operatively connected to said steam-supply means for supplying steam to the system intermittently in accordance with heat demands on the system, the improvement comprising a relay electrically connected to said thermostatic switch, said steam supply means and said vacuum producer operative to shut off the vacuum producer each time the steam-supply means is operated by said thermostatic switch to supply steam to the heaters and to start the vacuum producer in operation to evacuate the return line of the system each time the steam-supply means is shut off by said thermostatic switch.

15. In a space-heating system of the type having space heaters, a steam-supply line to the heaters, a return line from the heaters, electrically operated steam-supply means connected to the supply line for controlling flow of steam to the heaters, an electrically operated vacuum producer connected in the return line to maintain the heaters free from condensate and noncondensable gases, and a thermostatic switch operatively connected to said steam-supply means for supplying steam to the system intermittently in accordance with heat demands on the system, the improvement comprising a relay having an energizing coil and two pairs of contacts, the energizing coil being connected electrically in series with said thermostatic switch, one pair of contacts being connected in series with the control circuit of the electrically operated steam-supply means, and the other pair of contacts being electrically connected to the control circuit of the electrically operated vacuum producer, the arrangement being such that the thermostatic switch closes to energize the relay coil when the temperature in the system falls to a predetermined minimum, and energization of the relay coil closes the contacts in the control circuit of the steam supply means and opens the contacts to the vacuum producer so that steam is supplied to the system and the vacuum producer is shut off, and whereby opening of the thermostatic switch caused by a predetermined temperature rise in the vicinity of the switch de-energizes the relay coil, opens the contacts in the control circuit of the steam-supply means and closes the contacts in the control circuit of the vacuum producer so as to shut off steam to the system and start the vacuum producer in operation.

References Cited in the file of this patent

UNITED STATES PATENTS

| 2,223,689 | Jennings | Dec. 3, 1940 |
| 2,312,192 | Reader | Feb. 23, 1943 |